United States Patent [19]

Hara et al.

[11] Patent Number: 5,112,927
[45] Date of Patent: May 12, 1992

[54] METHOD FOR PRODUCING A STEREOREGULAR POLYOLEFIN

[75] Inventors: Daiji Hara, Yokkaichi; Mitsuhiro Mori, Aichi; Yozo Kondo, Yokkaichi, all of Japan

[73] Assignee: Tosoh Corporation, Shinnanyo, Japan

[21] Appl. No.: 454,401

[22] Filed: Dec. 21, 1989

[30] Foreign Application Priority Data

Dec. 26, 1988 [JP] Japan .................. 63-326199
Jun. 27, 1989 [JP] Japan .................. 1-162584

[51] Int. Cl.$^5$ .................. C08F 4/654; C08F 4/656; C08F 10/04
[52] U.S. Cl. .................. 526/124; 502/125; 502/126; 502/127; 526/128; 526/132; 526/351
[58] Field of Search .................. 526/128, 132, 133, 124

[56] References Cited

U.S. PATENT DOCUMENTS 4,175,170 11/1979 Schweier et al. .................. 526/124

FOREIGN PATENT DOCUMENTS 0230707 8/1987 European Pat. Off. .
0275317 7/1988 European Pat. Off. .
3124350 1/1983 Fed. Rep. of Germany .
2517681 6/1983 France .
2531717 2/1984 France .

*Primary Examiner*—Edward J. Smith
*Attorney, Agent, or Firm*—Oblon, Spivak, McClelland, Maier & Neustadt

[57] ABSTRACT

A method for producing a stereoregular polyolefin in the presence of a catalyst comprising a transition metal compound and an organometallic compound, wherein a catalyst system is employed which comprises (i), (ii) and (iii): (A) a solid catalyst component obtained by reacting to a uniform solution containing (i) at least one member selected from the group consisting of metallic magnesium and an organic hydroxide compound and an oxygen-containing organic magnesium compound, (ii) a compound of Group IIIB of the Periodic Table, and (iii) an oxygen-containing organic silicon compound, (iv) at least one aluminum halide, to obtain a solid product, and reacting to the solid product, (v) an electron donative compound, and (vi) a titanium halide compound; (B) at least one member selected from the group consisting of organometallic compounds of metals of Groups IA, IIA, IIB, IIIB and IVB of the Periodic Table; and (C) an electron donative compound.

17 Claims, No Drawings

METHOD FOR PRODUCING A STEREOREGULAR POLYOLEFIN

The present invention relates to a method for producing a stereoregular polyolefin. More particularly, the present invention relates to a method for polymerizing an α-olefin having at least 3 carbon atoms (including copolymerization with other α-olefins) by means of a certain specific catalyst, whereby a highly stereoregular polymer having a good particle shape can be obtained in good yield.

As a catalyst for polymerization of olefins, there has been known, for example, α-type titanium trichloride obtained by reducing titanium tetrachloride with hydrogen, purple-colored γ-titanium trichloride obtained by reducing titanium tetrachloride with aluminum, or δ-type titanium trichloride obtained by pulverizing these titanium trichlorides by a ball mill. Further, it is also known to modify these catalysts by mixing and pulverizing them together with various modifiers. However, when these catalysts are used for polymerization, the polymerization activities are rather low, and catalyst residues remain in a substantial amount in the resulting polymers, whereby a so-called deashing step is required. Further, in recent years, a number of proposals have been made for the preparation of a solid catalyst component comprising magnesium, titanium and halogen as main components. However, in many of them, a further improvement is desired with respect to the catalytic activities, the stereoregularities of polymers, the powder properties, etc.

The present inventors have previously proposed methods for obtaining stereoregular polyolefins in good yields by means of certain specific solid catalyst components comprising magnesium, titanium and halogen as the main components in Japanese Unexamined Patent Publications No. 3007/1988, No. 314210/1988, No. 317502/1988 and No. 105/1989. According to these methods, a reaction product of an aluminum halide compound with a uniform solution containing magnesium, titanium and an electron donative compound, is reacted with a titanium halide and an electron donative compound, to obtain a catalyst component excellent in the catalytic activities, the stereoregularities of polymers and the powder properties. However, in these methods, a titanium compound is used for the preparation of the uniform solution. Therefore, subsequent to the reaction of the uniform solution with the aluminum halide, the titanium compound tends to serve as active species and sometimes causes a deterioration of the catalytic activities and the stereoregularities of polymers.

In order to overcome such inadequacies of the conventional techniques, the present inventors have conducted extensive studies to find out a method for preparing a catalyst for polymerization of an α-olefin having at least 3 carbon atoms without using a titanium compound which is likely to serve as active species, for the preparation of the uniform solution. As a result, the present invention has been accomplished by using a solid catalyst component prepared by employing a uniform solution obtained by using an oxygen-containing organic silicon compound and a compound of Group IIIB of the Periodic Table without using the oxygen-containing organic titanium compound in the method as disclosed in e.g. the above-mentioned Japanese Unexamined Patent Publication No. 3007/1988, and, as cocatalysts, an organometallic compound and an electron donative compound.

Thus, the present invention provides a method for producing a stereoregular polyolefin in the presence of a catalyst comprising a transition metal compound and an organometallic compound, wherein a catalyst system is employed which comprises:

(A) a solid catalyst component obtained by reacting to a uniform solution containing (i), (ii) and (iii):

(i) at least one member selected from the group consisting of metallic magnesium and an organic hydroxide compound, and an oxygen-containing organic magnesium compound, (ii) a compound of Group IIIB of the Periodic Table, and (iii) an oxygen-containing organic silicon compound, (iv) at least one aluminum halide, to obtain a solid product, and reacting to the solid product, (v) an electron donative compound, and (vi) a titanium halide compound;

(B) at least one member selected from the group consisting of organometallic compounds of metals of Groups IA, IIA, IIB, IIIB and IVB of the Periodic Table; and (C) an electron donative compound.

Now, the present invention will be described in detail with reference to the preferred embodiments.

The solid catalyst component to be used in the present invention can be prepared by reacting (i) metallic magnesium and an organic hydroxide compound, or an oxygen-containing organic magnesium compound, (ii) a compound of Group IIIB of the Periodic Table, and (iii) an oxygen-containing organic silicon compound such as a silicon alkoxide, to obtain a uniform solution; reacting to the uniform solution, (iv) an aluminum halide to obtain a solid product; and reacting to the solid product, (v) an electron donative compound and (vi) a titanium halide compound.

In a case where metallic magnesium and the organic hydroxide compound are used as the reactant (i), the metallic magnesium may be in any form i.e. in the form of a powder, particles, a foil or a ribbon, and as the organic hydroxide compound, alcohols, phenols and organic silanols are suitable. As the alcohols, straight chain or branched chain aliphatic alcohols, alicyclic alcohols or aromatic alcohol having from 1 to 18 carbon atoms, may be used. For example, methanol, ethanol, n-propanol, i-propanol, n-butanol, n-hexanol, 2-ethylhexanol, n-octanol, i-octanol, n-stearylalcohol, cyclopentanol, cyclohexanol and ethylene glycol may be mentioned. The organic silanols have at least one hydroxyl group and an organic group which is selected from the group consisting of alkyl, cycloalkyl, arylalkyl, aryl and alkylaryl groups having from 1 to 12 carbon atoms, preferably from 1 to 6 carbon atoms. For example, trimethylsilanol, triethylsilanol, triphenylsilanol and t-butyldimethylsilanol may be mentioned. As the phenols, pehnol, cresol, xylenol and hydroquinone may be mentioned.

These organic hydroxide compounds may be used alone or in combination as a mixture of two or more different kinds.

Further, when the solid catalyst component (A) of the present invention is obtained by using metallic magnesium, it is preferred to add one or more substances which are capable of reacting with metallic magnesium or of forming an addition compound, for example, polar substances, such as iodine, mercury chloride, an alkyl halide, and an organic acid, for the purpose of facilitating the reaction.

Next, compounds belonging to the oxygen-containing organic magnesium compound include, for example, magnesium alkoxides such as methylate, ethylate, isopropylate, decanolate, methoxyethylate and cyclohexanolate, magnesium alkyl alkoxides such as ethylethylate, magnesium hydroalkoxides such as hydroxymethylate, magnesium phenoxides, such as phenate, naphthenate, phenanthlenate and cresolate, magnesium carboxylates such as acetate, stearate, benzoate, phenyl acetate, adipate, sebacate, phthalate, acrylate and oleate, oximates such as butyl oximate, dimethyl glyoximate and cyclohexyl oximate, hydroxamic acid salts, hydroxylamine salts such as N-nitro-SO-N-phenylhydroxylamine derivatives, enolates such as acetylacetonate, and magnesium silanolates such as triphenyl silanolate. These oxygen-containing organic magnesium compounds may be used alone or in combination as a mixture of two or more different kinds.

As the compound of Group IIIB of the Periodic Table of the reactant (ii), a boron compound of the formula $R^2_mB(OR^1)_nX_{3-(m+n)}$, and an aluminum compound of the formula $Al(OR^1)_iX_{3-i}$ may be used. In these formulas, each of $R^1$ and $R^2$ is a hydrocarbon group having from 1 to 20 carbon atoms, preferably from 1 to 10 carbon atoms, such as a straight chain or branched chain alkyl group, a cycloalkyl group, an arylalkyl group, an aryl group or an alkylaryl group, a halogenated hydrocarbon group, an amino-substituted hydrocarbon group or a hydrogen atom, and may contain a carbonyl group in its chain; i, m and n are numbers satisfying $0 < i \leq 3$, $0 \leq m \leq 3$, $0 \leq n \leq 3$, and $0 \leq m+n \leq 3$; and X is a halogen atom.

Specific examples of such a boron compound include, for example, trimethoxyborane, triethoxyborane, tri-n-propoxyborane, tri-i-propoxyborane, tri-n-butoxyborane, tri-i butoxyborane, tri-sec-butoxyborane, tri-tert-butoxyborane, tri(2-ethylhexyloxy)borane, triphenoxyborane, tribenzyloxyborane, di-i-propoxymethylborane, di-i-propoxyphenylborane, 2-aminoethyldiphenylborane, trimethylene borate (an ester of 1,3-propane diol with boric acid), butyl borate, triethylborane, tri-n-butylborane, tri-i-butylborane, tri-sec-butylborane, tri-sec-isoamylborane, triphenylborane, trimesitylborane, tris(4-fluorophenyl)borane, B-isopinocamphenyl-9-borabicyclo(3,3,1)nonane, 9-borabicyclo(3,3,1)nonane, di-sec-isoamylborane, chlorodiethoxyborane, dichloroethoxyborane, bromodiethylborane, trichloroborane, and tribromoborane. Use of a boron compound having some different substituents is also within the scope of the present invention. These boron compounds may be used alone or in combination as a mixture of two or more different types.

Specific examples of such an aluminum compound include, for example, trimethoxyaluminum, triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyloxy)aluminum, triphenoxyaluminum, tribenzyloxyaluminum, dichloromethoxyaluminum, chlorodimethoxyaluminum, dichloro(2-ethylhexyloxy)aluminum, chlorodi(2-ethylhexyloxy)aluminum, dichlorophenoxyaluminum, chlorodiphenoxyaluminum and hydroxydi(p-tert-butylbenzoic acid)aluminum. Use of an aluminum compound having some different alkoxy groups and halogen atoms, is within the scope of the present invention. These aluminum compounds may be used alone or in combination as a mixture of two or more different types.

Use of a mixture of some different boron compounds and aluminum compounds as mentioned above, is also within the scope of the present invention.

As the oxygen-containing organic silicon compound of the reactant (iii), an oxygen-containing organic silicon compound of the formula $R^3_pSi(OR^4)_qX^{4-(p+q)}$ may be used. In this formula, each of $R^3$ and $R^4$ is a hydrocarbon group having from 1 to 20 carbon atoms, preferably from 1 to 10 carbon atoms, such as a straight chain or a branched alkyl group, a cycloalkyl group, an arylalkyl group, an aryl group or an alkylaryl group, or a hydrogen atom, and p and q are numbers satisfying $0 \leq p \leq 3$, $1 \leq q \leq 4$, and $1 \leq p+q \leq 4$, and X is a halogen atom. Specifically, an alkoxysilane or an aryloxysilane, such as tetramethoxysilane, tetraethoxysilane, tetra-n-propoxysilane, tetrai-propoxysilane, tetra-n-butoxysilane, tetra-i-pentoxysilane, tetra-n-hexoxysilane, tetraphenoxysilane, tetrakis(2-ethylhexyloxy)silane, tetrakis(2-ethylbutyoxy)silane, tetrakis(2-methoxyethoxy)silane, methyltrimethoxysilane, n-butyltrimethoxysilane, phenyltrimethoxysilane, vinyltrimethoxysilane, chloromethyltrimethoxysilane, 3-chloropropyltrimethoxysilane, 4-chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysialne, triethoxysilane, ethyltri-i-propoxysilane, vinyltri-i-propoxysilane, i pentyltri-n-butoxysilane, methyltri-i-pentoxysilane, ethyltri-i-pentoxysilane, methyltri-n-hexoxysilane, phenyltri-i-pentoxysilane, n-propyltrimethoxysilane, i-propyltrimethoxysilane, i-butyltrimethoxysilane, dimethyldimethoxysialne, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, dibenzyldiethoxysilane, diethoxysilane, dimethyldi-n-butoxysilane, dimethyldi-i-pentoxysilane, diethyldi-i-pentoxysilane, di-i-butyldi-i-pentoxysilane, diphenyldiipentoxysilane, diphenyldi-n-octoxysilane, diisobutylmethoxysilane, trimethylmethoxysilane, trimethylethoxysilane, dimethylethoxysilane, trimethyl-i-propoxysilane, trimethyl-n-propoxysilane, trimethyl-t-butoxysilane, trimethyl-i-butoxysilane, trimethyl-n-butoxysilane, trimethyl-n-pentoxysilane, or trimethelthenoxysilane; or a haloalkoxysilane or a haloaryloxysilane such as dichlorodiethoxysilane, dichlorodiphenoxysilane, or tribromoethoxysilane, may be mentioned. Such oxygen-containing silicon compounds may be used alone or in combination as a mixture or as a reaction product of two or more different types.

As the aluminum halide compound of the reactant (iv) a compound of the formula $AlR^5_rX_{3-r}$ may be used. In the formula, $R^5$ is a hydrocarbon group having from 1 to 20 carbon atoms, X is a halogen atom, and r is a number satisfying $0 < r \leq 2$. $R^5$ is preferably selected from the group consisting of a straight chain or branched alkyl group, an alkoxy group, a cycloalkyl group, an arylalkyl group, an aryl group and an alkylaryl group. Such aluminum halide compounds may be used alone or in combination as a mixture of two or more different types. Specific examples of the aluminum halide include, for example, ethylaluminum dichloride, n-propylaluminum dichloride, butylaluminum dichloride, i-butylaluminum dichloride, sesquiethylaluminum chloride, sesqui-i-butylaluminum chloride, sesqui-i-propylaluminum chloride, sesqui-n-propylaluminum chloride, diethylaluminum chloride, di-i-propylaluminum chloride, di-n-propylaluminum chloride, di-i-butylaluminum chloride, diethylaluminum bromide and diethylaluminum iodide.

As the electron donative compound of the reactant (v), an ether, an ester, a ketone, a phenol, an amine, an amide, an imine, a nitrile, a phosphine, a phosphite, a stibine, an arsine, a phosporylamide and an alkolate may be mentioned. Among them, esters are preferred, and organic esters are most preferred. As such organic esters, mono or diesters of aromatic carboxylic acids, or mono or diesters of aliphatic carboxylic acids may be mentioned. Specific examples include, for example, butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, methyl p-toluate, ethyl p-tertbutylbenzoate, ethyl p-anisate, isobutyl α-naphthoate, ethyl cinnamate, monomethyl phthalate, dibutyl phthalate, diisobutyl phthalate, dihexyl phthalate, dioctyl phthlate, di-2-ethylhexyl phthalate, diallyl phthalate, diphenyl phthalate, diethyl isophthalate, diisobutyl isophthalate, diethyl.terephthalate, dibutyl terephthalate, diethyl naphthalate and dibutyl naphthalate. Such electron donative compounds (v) may be used alone or in combination as a mixture of two or more different types.

As the titanium halide compound of the reactant (vi), a titanium compound of the formula $Ti(OR^6)_fX_{4-f}$ may be employed. In the formula, $R^6$ is a hydrocarbon having from 1 to 20 carbon atoms, X is a halogen atom, and f is a number satisfying $0 \leq f < 4$. $R^6$ is preferably selected from the group consisting of a straight chain or branched alkyl group, an alkoxy group, a cycloalkyl group, an arylalkyl group, an aryl group and an alkylaryl group. Such titanium halide compounds may be used alone or in combination as a mixture of two or more different types. Specific examples of such a titanium halide compound include, for example, titanium tetrachloride, ethoxytitanium trichloride, propoxytitanium trichloride, butoxytitanium trichloride, phenoxytitanium trichloride, diethoxytitanium dichloride and triethoxytitanium chloride.

The solid catalyst component of the present invention can be prepared by reacting a reactant (iv) to a uniform solution obtained by reacting the reactants (i), (ii) and (iii), and then reacting the reactants (v) and (vi) to the resulting solid product.

These reactions are preferably conducted in a liquid medium. Therefore, when these reactants are not liquid by themselves under the operational conditions, or when the amount of liquid reactants is not sufficient, the reactions should be conducted in the presence of an inert organic solvent. As such an inert organic solvent, any solvent which is commonly used in this technical field may be employed. As such a solvent, a aliphatic, alicyclic or aromatic hydrocarbon or a halogen derivative thereof, or a mixture thereof may be mentioned. For example, isobutane, pentane, isopentane, hexane, heptane, cyclohexane, benzene, toluene, xylene, chlorobenzene, 1,2-dichlorobenzene, 1,3-dichlorobenzene, benzyl chloride, methylene dichloride, 1,2 dichloroethane, 1,3-dichloropropane, 1,4-dichlorobutane, 1,1,1-trichloroethane, 1,1,1,2-tetrachloroethane, 1,1,2,2-tetrachloroethane, tetrachloroethylene, carbon tetrachloride and chloroform may be mentioned. These organic solvents may be used alone or in combination as a mixture. In particular, when halogen derivatives or a mixture thereof is used, good results may sometimes be brought about with respect to the polymerization activities or the stereoregularities of polymers.

There is no particular restriction as to the amounts of the reactants (i), (ii), (iii), (iv), (v) and (vi) to be used in the present invention. However, the molar ratio of the magnesium atom (i) to the compound (ii) of Group IIIB of the Periodic Table is usually from 1:0.01 to 1:20, preferably from 1:0.05 to 1:10. The molar ratio of the magnesium atom (i) to the oxygen-containing organic silicon compound (iii) is usually from 1:0.01 to 1:20, preferably from 1:0.1 to 1:5. Further, the ratio of the magnesium atom (i) to the aluminum atom in the aluminum halide (iv) is usually from 1:0.1 to 1:100, preferably from 1:0.1 to 1:20. If the ratio of the aluminum atom exceeds this range, the catalytic activities tend to be poor, and if the ratio is too small, it will be difficult to obtain good powder properties.

The molar ratio of the magnesium atom (i) to the electron donative compound (v) is usually from 1:0.05 to 1:2.0, preferably from 1:0.1 to 1:1.0. If the ratio is outside this range, there will be problems such that the polymerization activities will be poor, or the stereoregularities of polymers will be low. Further, the molar ratio of the magnesium atom (i) to the titanium halide compound (vi) is usually within a range of from 1:1 to 1:100, preferably from 1:3 to 1:50. If the molar ratio is outside this range, there will be problems such that the polymerization activities will be low, or the product undergoes coloration.

The reaction of the reactants (i), (ii) and (iii) to obtain a uniform solution, is conducted at a temperature within a range of from $-50°$ to $300°$ C., preferably from 0 to $200°$ C. for from 0.5 to 50 hours, preferably from 1 to 6 hours in an inert gas atmosphere under atmospheric or elevated pressure. Further, the reaction of the reactants (iv), (v) and (vi) is conducted at a temperature within a range of from $-50°$ to $200°$ C., preferably from $-30°$ to $150°$ C. for from 0.2 to 50 hours, preferably from 0.5 to 5 hours in an inert gas atmosphere under atmospheric or elevated pressure. The reaction condition for the reactant (iv) is important, since it plays a decisive role for the particle shape of the resulting particles. Further, it is preferred to let a surfactant be present. The surfactant to be used, may be an anionic surfactant, a cationic surfactant, a nonionic surfactant or an amphoteric surfactant. Among them, a nonionic surfactant is most preferred. The nonionic surfactant includes a polyoxyethylenealkyl ether such as polyoxyethylenelauryl ether, polyoxyethylenecetyl ether, polyoxyethylenestearyl ether, polyoxyethyleneoleyl ether or a polyoxyethylenepolyhydric alcohol ether, a polyoxyethylenealkylaryl ether such as polyoxyethyleneoctylphenyl ether or polyoxyethylenenonylphenyl ether, a $C_{12}$--$C_{18}$ fatty acid ester of a $C_2$-$C_{12}$ polyhydroxy alcohol, such as sorbitan fatty acid ester, ethylene glycol fatty acid ester, diethylene glycol fatty acid ester, propylene glycol fatty acid ester or a glycerol fatty acid ester, and a polyoxyethylenealkyl amine. Particularly preferred is a sorbitan fatty acid ester. The sorbitan fatty acid ester include, for example, sorbitan monolaurate, sorbitan monopalmitate, sorbitan monostearate, sorbitan tristearate, sorbitan monooleate, sorbitan sesquioleate or sorbitan distearate. Further, a fluorine type surfactant may be employed. As a fluorine type surfactant, a nonionic perfluoroalkylethylene oxide adduct may be mentioned.

Such surfactants may be used alone or in combination as a mixture of two or more different types.

The reaction of the reactant (vi) may be conducted stepwisely i.e. in multiple steps. In such a case, an improvement in the polymerization activities and in the stereoregularities of polymers may sometimes be obtained.

The solid catalyst component (A) thus obtained, may be used as it is, but is usually subjected to filtration or decantation to remove unreacted materials and by-products, thoroughly washed with an inert organic solvent and then suspended in an inert organic solvent for use. It is also possible to use the one which is isolated after washing, followed by heating under atmospheric or reduced pressure to remove the inert organic solvent.

The solid catalyst component of component (A) thus obtained, is used for the polymerization of an olefin in combination with the organometallic compound of component (B) and the electron donative compound of component (C). As the organometallic compound of component (B), an organometallic compound composed of a metal such as lithium, magnesium, zinc, tin or aluminum and an organic group may be mentioned. As such an organic group, an alkyl group may be mentioned as a representative. As such an alkyl group, a straight chain or branched chain alkyl group having from 1 to 20 carbon atoms may be used. Specifically, n-butyllithium, diethylmagnesium, diethylzinc, trimethylaluminum, triethylaluminum, tri-i-butylaluminum, tri-n-butylaluminum, tri-n-decylaluminum, tetraethyltin or tetrabutyltin may, for example, be mentioned. It is particularly preferred to employ a trialkylaluminum having straight chain or branched chain alkyl groups of from 1 to 10 carbon atoms. Further, an alkyl metal halide having an alkyl group of from 1 to 20 carbon atoms, such as ethylaluminum sesquichloride, diethylaluminum chloride or diisobutylaluminum chloride, or an alkyl metal alkoxide such as diethylaluminum ethoxide, may also be employed.

These organometallic compounds may be used alone or in combination as a mixture of two or more different types.

As the electron donative compound of component (C), an organic acid ester, an oxygen-containing organic silicon compound or a nitrogen-containing organic compound, is suitable. As the organic acid ester, the same compounds as the reactant (v) used for the preparation of the solid catalyst component of component (A), may be mentioned. Among them, an aliphatic carboxylic acid ester and an aromatic carboxylic acid ester are preferred. Specifically, the aliphatic carboxylic acid ester includes those having from 2 to 18 carbon atoms such as ethyl acetate, propyl acetate, butyl acetate, methyl propionate, ethyl propionate, propyl propionate and ethyl butyrate. The aromatic carboxylic acid ester includes those having from 1 to 24 carbon atoms such as methyl benzoate, ethyl benzoate, methyl toluate, ethyl toluate, methyl anisate and ethyl anisate. These organic acid esters may be used alone or in combination as a mixture of two or more different types. As the oxygen-containing organic silicon compound, the same compounds as the above-mentioned reactant (iii) may be mentioned. Such oxygen-containing organic silicon compounds may be used alone or in combination as a mixture of two or more different types, and may be the same or different types of compounds as the reactant (iii). The nitrogen-containing organic compound may be a compound having a nitrogen atom in its molecule and having a function as a Lewis base. Specifically, it includes amide compounds such as acetic acid N,N-dimethylamide, benzoic acid N,N-dimethylamide and toluylic acid N,N-dimethylamide, piperidine type compounds such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, tetraethylpiperidine, 2,2,6,6-tetramethyl-4-piperidyl benzoate and bis(2,2,6,6-tetramethyl-4piperidyl)sebacate, pyridine type compounds such as 2,6-diisopropylpyridine, 2,6-diisobutylpyridine and 2-isopropyl-6-methylpyridine, pyrrolidine type compounds such as 2,2,5,5-tetramethylpyrrolidine, 2,5-diisopropylpyrrolidine, 2,2,5-trimethylpyrrolidine, 1,2,2,5,5-pentamethylpyrrolidine and 2,5-diisobutylpyrrolidine, amine type compounds such as trimethylamine, triethylamine, tributylamine, tribenzylamine, tetramethylethylenediamine, diisopropylethylamine, tert-butyldimethylamine, diphenylamine and di-o-tolylamine, and aniline type compounds such as N,N-diethylaniline and N,N-diisopropylaniline. Such nitrogen-containing compounds may be used alone or in combination as a mixture of two or more different types.

These electron donative compounds may be used in combination.

The solid catalyst component of component (A) is used preferably in an amount corresponding to from 0.001 to 2.5 mmol of titanium atom per liter of the reactor. The organometallic compound of component (B) is used preferably at a concentration of from 0.02 to 50 mmol, preferably from 0.2 to 5 mmol, per liter of the reactor. The electron donative compound of component (C) is used usually at a concentration of from 0.001 to 50 mmol, preferably from 0.01 to 5 mmol, per liter of the reactor.

There is no particular restriction as to the manner of introducing these three components in the present invention. For example, it is possible to employ a method wherein components (A), (B) and (C) are separately introduced to the reactor, or a method wherein components (A) and (B) are contacted first, and then component (C) is contacted thereto, followed by polymerization, or a method wherein components (B) and (C) are contacted first, and then component (A) is contacted thereto, followed by polymerization, or a method wherein components (A), (B) and (C) are contacted one another, followed by polymerization.

The polymerization of an olefin is conducted in a gas phase or in a liquid phase at a reaction temperature of lower than the melting point of the polymer. When the polymerization is conducted in a liquid phase, the olefin itself may be used as a reaction medium, but an inert solvent may be employed as a reaction medium. Such an inert solvent may be any solvent which is commonly used in this technical field. However, an alkane or cycloalkane having from 4 to 20 carbon atoms such as isobutane, pentane, hexane or cyclohexane is particularly suitable.

In the method for producing a stereoregular polyolefin according to the present invention, the olefin to be polymerized may be an α-olefin of the formula R—CH=CH$_2$ wherein R is a straight chain or branched chain substituted or unsubstituted alkyl group having from 1 to 10 carbon atoms, particularly from 1 to 8 carbon atoms. Specifically, propylene, 1-butene, 1-pentene, 4-methyl-1-pentene and 1-octene may be mentioned. These olefins may be subjected to not only homopolymerization but also random copolymerization or block copolymerization. For the copolymerization, at least two types of the above-mentioned α-olefins or a combination of such an α-olefin with a diene such as butadiene or isoprene may be used for the polymerization. It is particularly preferred to conduct the polymerization using propylene, propylene and ethylene, propylene and above-mentioned α-olefin other than propylene, or propylene and a diene.

There is no particular restriction as to the polymerization reaction conditions, so long as the polymerization is conducted at a reaction temperature of lower than the melting point of the polymer. However, the polymerization reaction conditions are usually selected within a reaction temperature of from 20° to 100° C. and a pressure of from 2 to 50 kg/cm$^2$.

The reactor to be used for the polymerization may be of any type which is commonly used in this technical field. The polymerization operation may be conducted in a continuous system, a semibatch system or a batch system by using a stirring tank type reactor, a fluidized bed type reactor or a circulating system reactor. Further, it is also possible to conduct the polymerization in two or more steps under different polymerization reaction conditions.

The first effect of the present invention resides in excellent powder properties i.e. it is possible to obtain polymer particles having a proper average particle size with a high bulk density and containing no substantial amount of fine particles. This effect is particularly remarkable when the present invention is applied to a gas phase polymerization. Further, it is also possible to obtain polymer particles having an extremely narrow particle size distribution. Therefore, in the polymerization step, formation of substances deposited in the polymerization reactor can be avoided, and in the slurry polymerization method, separation of the polymer, and separation and filtration of the polymer slurry in the drying step can be facilitated, and scattering of fine particles of the polymer out of the system can be prevented. Further, the drying efficiency will be improved by the improvement of the flowability. In the transportation step, no bridge will be formed in the cylo, and troubles involved in the transportation can be eliminated.

The second effect is that the polymerization activities are very high, and it is possible to obtain a polymer which does not require a deashing step intended for the removal of the remaining catalyst. Since the catalyst has highly active, the product is free from coloration or odor, and no purification of the polymer will be required. This is economically very advantageous.

The third effect is that the stereoregularity of the polymer is extremely good. Accordingly, this method is very advantageous for the production of a polymer by a gas phase polymerization where no reaction medium is used.

Now, the present invention will be described in further detail with reference to the Examples. However, it should be understood that the present invention is by no means restricted by such specific Examples. In the Examples and Comparative Example, the melt flow rate (hereinafter referred to simply as MFR) was measured under the condition L in accordance with ASTM D-1238. The isotactic index (hereinafter referred to simply as II) is the proportion of an insoluble polymer after the extraction with n-heptane to the total formed polymer represented by a weight percentage. The catalytic activities is represented by the production (g) of the polymer per gram of the solid catalyst component (A). For the determination of the breadth of the particle size distribution of the polymer particles, polymer particles were classified by sieves, the results were plotted on a logarithmic probability paper, a geometric standard deviation was obtained from an approximate linear line by a conventional method, and the breadth of the particle size distribution was represented by its common logarithms (hereinafter referred to as $\sigma$). Further, the average particle size is a value of the particle size corresponding to 50% of the weight integration of the above approximate linear line. The content of fine particles is the proportion of fine particles having a particle size of not larger than 105 μm, represented by a weight percentage.

EXAMPLE 1

(a) Preparation of solid catalyst component (A)

Into a 3 l flask equipped with a stirrer, 15 g (0.62 mol) of metallic magnesium powder was charged, 0.75 g of iodine, 401.7 g (3.1 mol) of 2-ethylhexanol, 151.5 g (0.62 mol) of diphenyldimethoxysilane and 114.2 g (0.50 mol) of tributoxyborane were added thereto. The mixture was heated to 90° C. and stirred under a nitrogen atmosphere for 1 hour. Then, the mixture was heated to 140° C. and reacted for 2 hours to obtain a uniform solution containing magnesium, silicon and boron (a Mg—Si—B solution). Into a flask having an internal capacity of 500 ml, the Mg—Si—B solution was charged in an amount corresponding to 0.066 mol of Mg and cooled to 0° C. Then, a solution of 10.4 g (0.067 mol) of isobutylaluminum dichloride diluted with 157 ml of hexane, was added thereto over a period of 2 hours. After completion of the addition, the mixture was heated to 70° C. over a period of 1 hour to obtain a slurry containing a white solid product. The solid product was separated by filtration and washed with hexane. To the slurry containing the white solid product thus obtained, a solution of 125 g (0.66 mol) of titanium tetrachloride diluted with 125 g of chlorobenzene, was added in the total amount. Then, 7.3 g (0.0264 mol) of diisobutyl phthalate was added thereto, and the mixture was reacted at 100° C. for 3 hours. The product was filtered to obtain a solid component. The solid component was again suspended in a solution of 125 g of titanium tetrachloride diluted with 125 g of chlorobenzene, and the suspension was stirred at 100° C. for 2 hours. Hexane was added to the product, and washing operation was conducted thoroughly until free titanium compound was no longer detected, to obtain a slurry of a solid catalyst component (A) suspended in hexane. The supernatant was removed, and the product was dried under a nitrogen atmosphere and subjected to elemental analysis, whereby Ti was found to be 3.2% by weight.

(b) Polymerization of propylene

A stainless steel autoclave having an internal capacity of 5 l and equipped with a magnetic stirrer, was thoroughly flushed with nitrogen, and 1.3 mmol of triethylaluminum as catalyst component (B), 0.33 mmol of diphenyldimethoxysilane as catalyst component (C) and 10 mg of the solid catalyst component (A) were sequentially added. The inner pressure of the autoclave was adjusted to 0.1 kg/cm$^2$ G. Then, 0.2 kg/cm$^2$ of hydrogen was added, and 2,000 ml of liquefied propylene was added thereto. After initiating the stirring, the temperature was raised to 70° C., and polymerization was conducted for 90 minutes. After completion of the polymerization reaction, the stirring was stopped and at the same time unreacted propylene in the system was discharged to recover the formed polymer. As a result, the formed polymer was 374 g, which corresponds to the catalytic activities of 37,400 g/g. Various properties of the polymer particles were examined, whereby the results were as follows: MFR: 2.9 g/10 min., II: 98.2%, bulk density: 0.39 g/cm$^3$, average particle size: 1,260 μm, σ: 0.19, and fine particle content: 0% by weight.

EXAMPLE 2

A solid catalyst component was prepared in the same manner as in Example 1 except that in the preparation of the solid catalyst component (A), 18.1 g (0.12 mol) of triethoxyborane was used as the reactant (ii) and 336.4 g (0.62 mol) of tetrakis(2-ethylhexyloxy)silane was used as the reactant (iii) in step (a) in Example 1.

The polymerization of propylene was conducted under the same condition as in step (b) in Example 1 by using the solid catalyst component thus obtained. As a result, the catalytic activities were 16,700 g/g. The various properties of the polymer particles were measured, whereby the following results were obtained: MFR: 3.5 g/10 min., II: 99.0%, bulk density: 0.42 g/cm$^3$, average particle size: 820 μm, o: 0.22, and fine particle content: 2.0% by weight.

EXAMPLE 3

A solid catalyst component was prepared in the same manner as in Example 1 except that in the preparation of a solid catalyst component (A), 90.5 g (0.62 mol) of triethoxyborane was used as the reactant (ii), 336.4 g (0.62 mol) of tetrakis(2-ethylhexoxy)silane was used as the reactant (iii), and 16.9 g (0.133 mol) of ethylaluminum dichloride was used as the reactant (iv), in the step (a) in Example 1.

The polymerization of propylene was conducted under the same condition as in Example 1 by using the solid catalyst component thus obtained. As a result, the catalytic activities were 7400 g/g. Further, various properties of the polymer particles were measured, whereby the results were as follows: MFR: 3.1 g/10 min., II: 97.7%, bulk density: 0.30 g/cm$^3$, average particle size 1,020 μm, σ: 0.35, and fine particle content: 0% by weight.

EXAMPLE 4

A solid catalyst component was prepared in the same manner as in Example 2 except that in the preparation of a solid catalyst component (A), 25.5 g (0.22 mol) of trichloroborane was used instead of triethoxyborane as used in step (a) in Example 2.

The polymerization of propylene was conducted under the same condition as in step (b) in Example 1 by using the solid catalyst component thus obtained. As a result, the catalytic activities were 18,500 g/g. Further, various properties of the polymer particles were measured, whereby the results were as follows: MFR: 10.4 g/10 min., II: 97.4%, bulk density: 0.36 g/cm$^3$, average particle size 550 μm, σ: 0.06, and fine particle content: 0% by weight.

EXAMPLE 5

A solid catalyst component was prepared in the same manner as in step (a) in Example 1 except that in the preparation of a solid catalyst component (A), a mixture comprising 54.3 g (0.37 mol) of triethoxyborane and 30.0 g (0.12 mol) of triphenylborane was used as the reactant (ii), 129.1 g (0.62 mol) of tetraethoxysilane was used as the reactant (iii), and 20.7 g (0.133 mol) of isobutylaluminum dichloride was used as the reactant (iv), in step (a) in Example 1.

The polymerization of propylene was conducted under the same condition as in step (b) in Example 1 by using the solid catalyst component thus obtained. As a result, the catalytic activities were 14,600 g/g. Further, various properties of the polymer particles were measured, whereby the results were as follows: MFR: 0.17 g/10 min., II: 97.6%, bulk density: 0.35 g/cm$^3$, average particle size 1,070 μm, σ: 0.25, and fine particle content: 1.1% by weight.

EXAMPLE 6

A solid catalyst component was prepared in the same manner as in step (a) in Example 1 except that in the preparation of a solid catalyst component (A), a mixture comprising 129.1 g (0.62 mol) of triethoxyborane and 123.4 g (0.31 mol) of hydroxydi(p-tert-butylbenzoic acid)aluminum, was used instead of the mixture comprising triethoxyborane and triphenylborane as used in Example 5, as the reactant (ii).

The polymerization of propylene was conducted under the same condition as in step (b) in Example 1 by using the solid catalyst component thus obtained. As a result, the catalytic activities were 11,200 g/g. Further, various properties of the polymer particles were measured, whereby the results were as follows: MFR: 0.10 g/10 min., II: 97.2%, bulk density: 0.28 g/cm$^3$, average particle size 990 μm, σ: 0.22, and fine particle content: 1.5% by weight.

EXAMPLE 7

A solid catalyst component was prepared in the same manner as in Example 1 except that in the preparation of a solid catalyst component (a), the formed white solid product was used without washing with hexane after separation by filtration in step (a) in Example 1.

The polymerization of propylene was conducted under the same condition as in step (b) in Example 1 by using the soild catalyst component thus obtained. As a result, the catalystic activities were 30,400 g/g. Further, various properties of the polymer particles were measured, whereby the results were as follows: MFR: 3.2 g/10 min., II: 97.8%, bulk density: 0.39 g/cm$^3$, average particle size 1,010 μm, σ: 0.21, and fine particle content: 0% by weight.

This is equivalent to the performance of the solid catalyst component in Example 1.

COMPARATIVE EXAMPLE 1

A solid catalyst component was prepared in the same manner as in Example 1 except that in the preparation of a solid catalyst component (A), 211 g (0.62 mol) of tetra n-butoxytitanium was added without adding the tributoxyborane added as the reactant (ii) and the diphenyldimethoxysilane added as the reactant (iii) in step (A) in Example 1, and the formed white solid product was used without washing with hexane after separation by filtration.

The polymerization of propylene was conducted under the same condition as in step (b) in Example 1 by using the solid catalyst component thus obtained. As a result, the catalytic activities were 29,500 g/g. Further, various properties of the polymer particles were measured, whereby the results were as follows: MFR: 4.0 g/10 min., II: 94.9%, bulk density: 0.45 g/cm$^3$, average particle size 320 $\mu$m, $\sigma$: 0.08, and fine particle content: 0% by weight.

Particularly, a deterioration of the stereoregularity was observed.

COMPARATIVE EXAMPLE 2

A solid catalyst component was prepared in the same manner as in Example 2 except that in the preparation of a solid catalyst component (A), 62.7 g (0.33 mol) of titanium tetrachloride was used instead of isobutylaluminum dichloride used as the reactant (iv), and triethoxyborane added as the reactant (ii) in step (a) in Example 2 was not added.

The polymerization of propylene was conducted under the same condition as in step (b) in Example 1 by using the solid catalyst component thus obtained. As a result, the catalytic activities were 12,600 g/g. Further, various properties of the polymer particles were measured, whereby the results were as follows: MFR: 4.0 g/10 min., II: 97.5%, bulk density: 0.23 g/cm$^3$, average particle size: as small as 180 $\mu$m, $\sigma$: 0.44, and fine particle content: 25.2% by weight.

Thus, the particle size distribution was very wide, and the content of fine particulate polymer was substantial.

COMPARATIVE EXAMPLE 3

In the preparation of a uniform solution of Mg, the reaction was conducted under the same condition as in Example 1 except that tributoxyborane added as the reactant (ii) in step (a) in Example 1 was not added, whereby the reaction solution became viscous, and Mg residue was present.

COMPARATIVE EXAMPLE 4

In the preparation of a solid catalyst component (A), the reaction was conducted in the same manner as in Example 2 without adding tetrakis(2-ethylhexyloxy)silane and triethoxyborane used in Example 2, whereby the product became a jelly-like non uniform solution. By using this non-uniform solution, isobutylaluminum dichloride was added thereto and heated in the same manner as in Example 1, but no solid product was formed.

The results of the polymerization of propylene in Examples 1 to 7 and Comparative Examples 1 and 2 are shown in Table 1.

EXAMPLE 8

(a) Preparation of solid catalyst component (A)

Into a 3 l flask equipped with a stirrer, 15 g (0.62 mol) of metallic magnesium powder was charged, and 0.75 g of iodine, 401.7 g (3.1 mol) of 2-ethylhexanol, 336.4 g (0.62 mol) of tetrakis(2-ethylhexyloxy)silane and 126.5 g (0.62 mol) of triisopropoxyaluminum were added thereto. Further, 1 l of decane was added thereto, and the mixture was heated to 90° C and stirred under a nitrogen atmosphere for 1 hour. Then, the mixture was heated to 140° C. and reacted for 2 hours to obtain a uniform solution containing magnesium, silicon and aluminum (a Mg—Si—Al solution). Into a flask having an internal capacity of 500 ml, the Mg—Si—Al solution was added in an amount corresponding to 0.066 mol of Mg and cooled to 0° C. Then, a solution of 20.7 g (0.13 mol) of isobutylaluminum dichloride diluted to 50% with decane, was added thereto over a period of 2 hours. After completion of addition, the mixture was heated to 40° C. to obtain a slurry containing a white solid product. The slurry was washed with decane. The slurry containing the white solid product thus obtained, was heated to 100° C. Then, a solution of 125 g (0.66 mol) of titanium tetrachloride diluted with 125 g of chlorobenzene, was added in the total amount. Then, 7.3 g (0.0264 mol) of diisobutyl phthalate was added thereto, and the mixture was reacted at 100° C. for 3 hours. The product was filtered to obtain a solid component, which was again suspended in a mixture comprising 125 g of titanium tetrachloride and 125 g of chlorobenzene and stirred at 70° C. for 1 hour. Hexane was added to the product, and washing operation was conducted thoroughly until a free titanium compound was no longer detected, to obtain a slurry of the solid catalyst component (A) suspended in hexane. The supernatant was removed, and the product was dried under a nitrogen stream and subjected to elemental analysis, whereby Ti was 3.3% by weight.

(b) Polymerization of propylene

A stainless steel autoclave having an internal capacity of 5 l and equipped with a magnetic stirrer, was thoroughly washed with nitrogen, and 1.4 mmol of triethylaluminum as catalyst component (B), 0.35 mmol of diisobutyldimethoxysilane as catalyst component (C) and 10 mg of the solid catalyst component (A) were sequentially added. The inner pressure of the autoclave was adjusted to 0.1 kg/cm$^2$ G, and then hydrogen was added in an amount corresponding to 0.2 kg/cm$^2$. Then, 2,000 ml of liquefied propylene was added thereto. After initiating the stirring, the temperature was raised to 0° C., and polymerization was conducted for 90 minutes. After completion of the polymerization reaction, the stirring was stopped, and at the same time, unreacted propylene in the system was discharged to recover the formed polymer. As a result, the formed polymer was 611 g, which corresponds to the catalytic activities of 61,100 g/g. Further, various properties of the polymer particles were measured, whereby the results were as follows: MFR: 3.4 g/10 min., II: 99.4%, bulk density: 0.44 g/cm$^3$, average particle size: 410 $\mu$m, $\sigma$: 0.10, and fine particle content: 0% by weight.

EXAMPLE 9

A solid catalyst component was prepared in the same manner as in step (a) in Example 8 except that in the preparation of a solid catalyst component (A), 10.4 g (0.067 mol) of isobutylaluminum dichloride was used in step (a) in Example 8 as the reactant (iv).

The polymerization of propylene was conducted in the same manner as in step (b) in Example 8 by using the solid catalyst component thus obtained. As a result, the catalytic activities were 49,000 g/g. Further, various properties of the polymer particles were measured, whereby the results were as follows: MFR: 2.9 g/10 min., II: 99.5%, and bulk density: 0.48 g/cm$^3$. Further, the average particle size was as large as 3,810 $\mu$m, $\sigma$ was 0.30, and the fine particle content was 0% by weight.

EXAMPLE 10

A solid catalyst component (A) was prepared in the same manner as in step (a) in Example 8, except that in the preparation of a solid catalyst component (A) diisobutyldimethoxysilane was used instead of tetrakis(2-ethylhexyloxy)silane used in step (a) in Example 8 as the reactant (iii).

The polymerization of propylene was conducted under the same condition as in step (b) in Example 8 by using the solid catalyst component (A) thus obtained. As a result, the catalytic activities were 56,250 g/g. Further, various properties of the polymer particles were measured, whereby the results were as follows: MFR: 3.7 g/10 min., II: 99.2%, and bulk density: 0.40 g/cm$^3$, average particle size: 342 μm, σ: 0.14, and fine particle content was 0.2% by weight.

EXAMPLE 11

A solid catalyst component (A) was prepared in the same manner as in step (a) in Example 8 except that in the preparation of a solid catalyst component (A), ethylaluminum dichloride was used instead of isobutylaluminum dichloride used in step (a) in Example 8 as the reactant (iv).

The polymerization of propylene was conducted under the same condition as in step (b) in Example 8 by using the solid catalyst component (A). As a result, the catalytic activities were 51,200 g/g. Further, various properties of the polymer particles were measured, whereby the results were as follows: MFR: 3.1 g/10 min., II: 98.7%, and bulk density: 0.40 g/cm$^3$, average particle size: 400 μm, σ: 0.13, and fine particle content was 0% by weight.

COMPARATIVE EXAMPLE 5

A solid catalyst component was prepared in the same manner as in step (a) in Example 8 except that 62.7 g (0.33 mol) of titanium tetrachloride was used instead of isobutylaluminum dichloride used in step (a) in Example 8 as the reactant (iv).

The polymerization of propylene was conducted under the same condition as in step (b) in Example 8 by using the solid catalyst component thus obtained. As a result, the catalytic activities were 46,100 g/g. Further, various properties of the polymer particles were measured, whereby the results were as follows: MFR: 4.4 g/10 min., II: 97.7%, and bulk density: 0.30 g/cm$^3$, average particle size: 210 μm, σ: 0.36, and fine particle content was 3.9% by weight.

The results of the polymerization of propylene in Examples 8 to 11 and Comparative Example 5 are shown in Table 2.

EXAMPLE 12

(a) Preparation of solid catalyst component (A)

Into a 3 l flask equipped with a stirrer, 15 g (0.62 mol) of metallic magnesium powder was charged, 0.75 g of iodine, 401.7 g (3.1 mol) of 2-ethylhexanol, 253.0 g (1.24 mol) of diisobutyldimethoxysilane and 190.0 g (0.93 mol) of triisopropoxyaluminum were added thereto. The mixture was heated to 90° C. and stirred for 1 hour under a nitrogen atmosphere. Then, the mixture was heated to 140° C. and reacted for 2 hours to obtain a uniform solution containing magnesium, silicon and aluminum (a Mg—Si—Al solution).

To this uniform solution, 25.8 g of sorbitan distearate was added, and the mixture was stirred at 60° C. for 2 hours. Into a flask having an internal capacity of 500 ml, the Mg—Si—Al solution was charged in an amount corresponding to 0.066 mol of Mg and cooled to 0° C. Then, a solution of 10.4 g (0.067 mol) of isobutylaluminum dichloride diluted with 157 ml of hexane, was added over a period of 2 hours. After completion of the addition, the mixture was heated to 70° C. over a period of 1 hour to obtain a slurry containing a white solid product. The solid product was separated by filtration and then washed with hexane.

To the slurry containing the white solid product thus obtained, a solution of 125 g (0.66 mol) of titanium tetrachloride diluted with 125 g of chlorobenzene, was added in the total amount. Then, 7.3 g (0.0264 mol) of diisobutyl phthalate was added, and the mixture was reacted at 100° C. for 3 hours. The product was filtered to obtain a solid component, which was again suspended in a solution of 125 g of titanium tetrachloride diluted with 125 g of chlorobenzene, and the suspension was stirred at 100° C. for 2 hours. To the product, hexane was added, and washing operation was conducted thoroughly until a free titanium compound was no longer detected, to obtain a slurry of a solid catalyst component (A) suspended in hexane. The supernatant was removed, and the product was dried under a nitrogen atmosphere and subjected to elemental analysis, whereby Ti was 3.2% by weight.

(b) Polymerization of propylene

A stainless steel autoclave having an internal capacity of 5 l and equipped with a magnetic stirrer, was thoroughly flushed with nitrogen, and 1.3 mmol of triethylaluminum as catalyst component (B), 0.33 mmol of diphenyldimethoxysilane as catalyst component (C) and 10 mg of the solid catalyst component (A) were sequentially added. The pressure in the autoclave was adjusted to 0.1 kg/cm$^2$G, and hydrogen was added in an amount corresponding to 0.2 kg/cm$^2$, and 2,000 ml of liquefied propylene was added. After initiating the stirring, the temperature was raised to 70° C., and polymerization was conducted for 90 minutes. After completion of the polymerization reaction, the stirring was stopped, and at the same time, unreacted propylene in the system was discharged to recover the formed polymer. As a result, the formed polymer was 539 g, which corresponds to catalytic activities of 53,900 g/g. Further, various properties of the polymer particles were examined, whereby the results were as follows: MFR: 2.3 g/10 min., II 99.0%, bulk density: 0.48 g/cm$^3$, average particle size: 1,490 μm, σ: 0.13, and fine particle content: 0% by weight.

EXAMPLE 13

A solid catalyst component was prepared in the same manner as in Example 12 except that in the preparation of a solid catalyst component (A), 5.5 g (0.0198 mol) of din-butyl phthalate was added as the reactant (v) and 188 g (0.99 mol) of titanium tetrachloride was used as the reactant (vi) in step (a) in Example 12.

The polymerization of propylene was conducted under the same condition as in step (b) in Example 12 by using the solid catalyst component thus obtained. As a result, the catalytic activities were 44,100 g/g. Further, various properties of the polymer particles were examined, whereby the results were as follows: MFR: 2.2 g/10 min., II: 98.0%, bulk density: 0.48 g/cm$^3$, average particle size: 1,330 μm, σ: 0.13, and fine particle content: 0% by weight.

EXAMPLE 14

A solid catalyst component was prepared in the same manner as in Example 12 except that in the preparation of a solid catalyst component (A), 15 g (0.62 mol) of metallic magnesium powder and 459.5 g (6.2 mol) of 1-butanol were used as the reactant (i) and 675.8 g (1.24 mol) of tetrakis(2-ethylhexyloxy)silane was used as the reactant (iii) in step (a) in Example 12.

The polymerization of propylene was conducted under the same condition as in Example 12 by using the solid catalyst component thus obtained. As a result, the catalytic activities were 46,700 g/g. Further, various properties of the polymer particles were measured, whereby the results were as follows: MFR: 3.7 g/10 min., II: 98.5%, bulk density: 0.39 g/cm³, average particle size 394 μm, σ: 0.13, and fine particles content: 0.1% by weight.

EXAMPLE 15

A solid catalyst component was prepared in the same manner as in Example 12 except that in the preparation of a solid catalyst component (A), 125 g of 1,2-dichloroethane was used instead of chlorobenzene used to dilute titanium tetrachloride of the reactant (vi), and 2.5 g (0.0165 mol) of ethyl benzoate was used as the reactant (v).

The polymerization of propylene was conducted under the same condition as in step (b) in Example 12 by using the solid catalyst component thus obtained except that as the catalyst component (C), 0.65 mmol of ethyl benzoate was used, and the polymerization was conducted at 60° C. for 90 minutes. As a result, the catalytic activities were 21,750 g/g. Further, various properties of the polymer particles were measured, whereby the results were as follows: MFR: 5.1 g/10 min., II: 96.9%, bulk density: 0.45 g/cm³, average particle size: 1,100 μm, σ: 0.14, and fine particle content: 0% by weight.

EXAMPLE 16

A solid catalyst component was prepared in the same manner as in step (a) in Example 12 except that in the preparation of a solid catalyst component (A), 150.1 g (0.93 mol) of triethoxyaluminum was used as the reactant (ii) in step (a) in Example 12.

The polymerization of propylene was conducted under the same condition as in step (b) in Example 12 by using the solid catalyst component thus obtained. As a result, the catalytic activities were 54,900 g/g. Further, various properties of the polymer particles were measured, whereby the results were as follows: MFR: 3.1 g/10 min., II: 99.1%, bulk density: 0.48 g/cm³, average particle size: 1,410 μm, σ: 0.12, and fine particle content: 0% by weight.

EXAMPLE 17

A solid catalyst component was prepared in the same manner as in step (a) in Example 12 except that in the preparation of a solid catalyst component (A), 229.1 g (0.93 mol) of tri-tert-butoxyaluminum was used as the reactant (ii) in step (a) in Example 12.

The polymerization of propylene was conducted under the same condition as in step (b) in Example 12 by using the solid catalyst component thus obtained. As a result, the catalytic activities were 56,400 g/g. Further, various properties of the polymer particles were measured, whereby the results were as follows: MFR: 2.7 g/10 min., II: 98.8%, bulk density: 0.47 g/cm³, average particle size: 1,500 μm, σ: 0.10, and fine particle content: 0% by weight.

The results of the polymerization of propylene in Examples 12 to 17 are shown in Table 3.

TABLE 1

| | Catalytic activities (g/g cat.) | MFR (g/10 min.) | II (%) | Bulk density (g/cm³) | Average particle size (μm) | σ | Fine particle content (%) |
|---|---|---|---|---|---|---|---|
| Example 1 | 37400 | 2.9 | 98.2 | 0.39 | 1260 | 0.19 | 0 |
| Example 2 | 16700 | 3.5 | 99.0 | 0.42 | 820 | 0.22 | 2.0 |
| Example 3 | 7400 | 3.1 | 97.7 | 0.30 | 1020 | 0.35 | 0 |
| Example 4 | 18500 | 10.4 | 97.4 | 0.36 | 550 | 0.06 | 0 |
| Example 5 | 14600 | 0.17 | 97.6 | 0.35 | 1070 | 0.25 | 1.1 |
| Example 6 | 11200 | 0.10 | 97.2 | 0.28 | 990 | 0.22 | 1.5 |
| Example 7 | 30400 | 3.2 | 97.8 | 0.39 | 1010 | 0.21 | 0 |
| Comparative Example 1 | 29500 | 4.0 | 94.9 | 0.45 | 320 | 0.08 | 0 |
| Comparative Example 2 | 12600 | 4.0 | 97.5 | 0.23 | 180 | 0.44 | 25.2 |

TABLE 2

| | Catalytic activities (g/g cat.) | MFR (g/10 min.) | II (%) | Bulk density (g/cm³) | Average particle size (μm) | σ | Fine particle content (%) |
|---|---|---|---|---|---|---|---|
| Example 8 | 61100 | 3.4 | 99.4 | 0.44 | 410 | 0.10 | 0 |
| Example 9 | 49000 | 2.9 | 99.5 | 0.48 | 3810 | 0.30 | 0 |
| Example 10 | 56250 | 3.7 | 99.2 | 0.40 | 342 | 0.14 | 0.2 |
| Example 11 | 51200 | 3.1 | 98.7 | 0.40 | 400 | 0.13 | 0 |
| Comparative Example 5 | 46100 | 4.4 | 97.7 | 0.30 | 210 | 03.6 | 3.9 |

TABLE 3

|  | Catalytic activities (g/g cat.) | MFR (g/10 min.) | II (%) | Bulk density (g/cm³) | Average particle size (μm) | σ | Fine particle content (%) |
|---|---|---|---|---|---|---|---|
| Example 12 | 53900 | 2.3 | 99.0 | 0.48 | 1490 | 0.13 | 0 |
| Example 13 | 44100 | 2.2 | 98.0 | 0.48 | 1330 | 0.13 | 0 |
| Example 14 | 46700 | 3.7 | 98.5 | 0.39 | 394 | 0.13 | 0.1 |
| Example 15 | 21750 | 5.1 | 96.9 | 0.45 | 1100 | 0.14 | 0 |
| Example 16 | 54900 | 3.1 | 99.1 | 0.48 | 1410 | 0.12 | 0 |
| Example 17 | 56400 | 2.7 | 98.8 | 0.47 | 1500 | 0.10 | 0 |

What is claimed is:

1. A method for producing a stereoregular polyolefin by homopolymerizing an α-olefin having at least 3 carbon atoms or by copolymerizing said olefin with a different α-olefin in the presence of a catalyst comprising a transition metal compound and an organometallic compound, wherein a catalyst system is employed which comprises:

(A) a solid catalyst component obtained by reacting to a uniform solution reactants free of oxygen containing organic titanium compound and consisting essentially of (i), (ii) and (iii):

(i) at least one member selected from the group consisting of (a) metallic magnesium and an organic hydroxide compound which is an alcohol, phenol or silanol and (b) an oxygen-containing organic magnesium compound selected from the group consisting of a magnesium alkoxide, a magnesium alkyl alkoxide, a magnesium hydroalkoxide, a magnesium phenoxide, a magnesium carboxylate, a magnesium oximate, a magnesium hydroxamic salt, a magnesium hydroxylamine salt, a magnesium enolate and a magnesium silanolate, (ii) a compound of Group IIIB of the Periodic Table which is a boron compound or an aluminum compound, and (iii) an oxygen-containing organic silicon compound, with reactant, (iv) at least one aluminum halide, to obtain a solid product, and reacting the solid product with reactants, (v) an electron donative compound and (vi) a titanium halide compound;

(B) at least one member selected from the group consisting of organometallic compounds of metals of Groups IA, IIA, IIB, IIIB and IVB of the Periodic Table; and (C) an electron donative compound, wherein the boron compound of reactant (ii) is represented by the formula $R^2_m B(OR^1)_n X_{3-(m+n)}$ wherein each of $R^1$ and $R^2$ is a hydrocarbon group having from 1 to 10 carbon atoms which is a straight chain or branched chain alkyl group, a cycloalkyl group, an arylalkyl group, an aryl group or an alkylaryl group, a halogenated hydrocarbon group, an amino-substituted hydrocarbon group or a hydrogen atom, and may contain a carbonyl group in its chain, and m and n are numbers satisfying $0 \leq m \leq 3$, $0 \leq n \leq 3$ and $0 \leq m+n \leq 3$, and X is a halogen atom, wherein the aluminum compound of reactant (ii) is represented by the formula $Al(OR^1)_i X_{3-i}$ wherein $R^1$ is a hydrocarbon group having from 1 to 10 carbon atoms which is a straight chain or branched chain alkyl group, a cycloalkyl group, an arylalkyl group, an aryl group or an alkylaryl group, a halogenated hydrocarbon group, an amino-substituted hydrocarbon group or a hydrogen atom and may contain a carbonyl group in its chain, i is a number satisfying $0 < i \leq 3$, and X is a halogen atom, wherein the oxygen-containing organic silicon compound reactant (iii) is represented by the formula $R^3_p Si(OR^4)_q X_{4-(p+q)}$ wherein each of $R^3$ and $R^4$ is a hydrocarbon group having from 1 to 10 carbon atoms which si a straight chain or branched chain alkyl group, a cycloalkyl group, an arylalkyl group, an aryl group or an alkylaryl group, a halogenated hydrocarbon group, or a hydrogen atom, p and q are numbers satisfying $0 \leq p \leq 3$, $1 \leq q \leq 4$, and $1 \leq p+q \leq 4$, and X is a halogen atom, wherein the electron donative compound of the reactant (v) is an ether, an ester, a ketone, a phenol, an amine, an amide, an imine, a nitrile, a phosphine, a phosphite, a stinbine, an arsine, a phosphorylamide or an alkolate, and wherein the electron donative compound of component (C) is an organic acid ester, an oxygen-containing organic silicon compound or a nitrogen-containing organic compound, the oxygen-containing organic silicon compound having the same general form as that of reactant (iii).

2. The method according to claim 1, wherein the compound of Group IIIB of the Periodic Table is a boron compound.

3. The method according to claim 2, wherein the boron compound is $B(OR^1)_3$ and/or $BR^2_3$ and/or $BX_3$ wherein $R^1$, $R^2$ and X are as defined above.

4. The method according to claim 1, wherein the compound of Group IIIB of the Periodic Table is an aluminum compound.

5. The method according to claim 4, wherein the aluminum compound is $Al(OR^1)_3$ wherein $R^1$ is as defined above.

6. The method according to claim 1, wherein the compound of Group IIIB of the Periodic Table is a mixture of a boron compound and an aluminum compound.

7. The method according to claim 1, wherein the oxygen-containing organic silicon compound (iii) is represented by the formula $R^3_p Si(OR^4)_q$ wherein $R^3$ and $R^4$ are as defined above, and $p+q=4$.

8. The method according to claim 1, wherein the aluminum halide is represented by the formula $AlR^5 X_{3-r}$ wherein $R^5$ is a hydrocarbon group having from 1 to 20 carbon atoms, X is a halogen atom, and r is a number satisfying $0 < r \leq 2$.

9. The method according to claim 8, wherein the aluminum halide is $AlR^5 Cl_2$ wherein $R^5$ is as defined above.

10. The method according to claim 1, wherein the reaction of the aluminum halide with the uniform solution is conducted in the presence of a surfactant.

11. The method according to claim 10, wherein the surfactant is an ester obtained from a polyhydroxy alcohol having from 2 to 12 carbon atoms and a fatty acid having from 12 to 18 carbon atoms.

12. The method according to claim 1, wherein the electron donative compound (v) is an organic acid ester.

13. The method according to claim 12, wherein the organic acid ester is an aromatic monoester or diester.

14. The method according to claim 1, wherein the titanium halide compound is represented by the formula $Ti(OR^6)_fX_{4-f}$ wherein $R^6$ is a hydrocarbon having from 1 to 10 carbon atoms which is a straight or branched alkyl group, a cycloalkyl group, an arylalkyl group, an aryl group or an alkylaryl group, X is a halogen atom, and f is a number satisfying $0 \leq f < 4$.

15. The method according to claim 14, wherein the titanium halide compound is titanium tetrachloride.

16. The method according to claim 1, wherein the reaction of the titanium halide compound is conducted is more than one step.

17. The method according to claim 1, wherein the electron donative compound of the component (C) is an oxygencontainnig organic silicon compound represented by the formula $R^3_pSi(OR^4)_qX_{4-(p+q)}$ wherein each of $R^3$ and $R^4$ is a hydrocarbon group having from 1 to 10 carbon atoms which is a straight or branched alkyl group, a cycloalkyl group, an arylalkyl group, an aryl group or an alkylaryl group, a halogenated hydrocarbon group or a hydrogen atom, p and q are numbers satisfying $0 \leq p \leq 3, \leq q \leq 4$ and $1 \leq p+q \leq 4$, and X is a halogen atom.

* * * * *